(12) United States Patent
Takeda et al.

(10) Patent No.: US 10,951,104 B2
(45) Date of Patent: Mar. 16, 2021

(54) LINEAR ACTUATOR

(71) Applicant: NIDEC SANKYO CORPORATION, Nagano (JP)

(72) Inventors: Tadashi Takeda, Nagano (JP); Hiroshi Kitahara, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/322,127

(22) PCT Filed: Aug. 3, 2017

(86) PCT No.: PCT/JP2017/028220
§ 371 (c)(1),
(2) Date: Jan. 31, 2019

(87) PCT Pub. No.: WO2018/030265
PCT Pub. Date: Feb. 15, 2018

(65) Prior Publication Data
US 2019/0190365 A1 Jun. 20, 2019

(30) Foreign Application Priority Data
Aug. 9, 2016 (JP) .............................. JP2016-156894

(51) Int. Cl.
*H02K 33/16* (2006.01)
*B06B 1/04* (2006.01)
(Continued)

(52) U.S. Cl.
CPC ............... *H02K 33/16* (2013.01); *B06B 1/04* (2013.01); *H02K 5/24* (2013.01); *H02K 33/04* (2013.01)

(58) Field of Classification Search
CPC .......... H02K 33/16; H02K 33/04; H02K 5/24; B06B 1/04
(Continued)

(56) References Cited

U.S. PATENT DOCUMENTS 5,065,126 A 11/1991 Suzuki
2015/0015091 A1* 1/2015 Genderjahn ........... H02K 33/18
310/25

FOREIGN PATENT DOCUMENTS

CN 1277661 12/2000
CN 1319034 10/2001
(Continued)

OTHER PUBLICATIONS

"International Search Report (Form PCT/ISA/210)"of PCT/JP2017/028220, dated Oct. 10, 2017, with English translation thereof, pp. 1-4.
(Continued)

*Primary Examiner* — Terrance L Kenerly
(74) *Attorney, Agent, or Firm* — JCIPRNET

(57) ABSTRACT

Provided is a linear actuator including a movable element, a stationary element, a magnetic drive mechanism configured to linearly move the movable element in a first direction with respect to the stationary element, and damper member arranged between the movable element and the stationary element. The magnetic drive mechanism includes a coil holder arranged on the stationary element, a coil supported by a coil supporting unit of the coil holder, a first yoke arranged on the movable element, and a first permanent magnet held by the first yoke. The damper member is arranged in a portion where the first yoke and the coil holder face each other in the second direction. As a result, the damper member can be arranged between the stationary element and the movable element without using a case.

8 Claims, 5 Drawing Sheets

(51) Int. Cl.
*H02K 33/04* (2006.01)
*H02K 5/24* (2006.01)

(58) Field of Classification Search
USPC .............................................. 310/35
See application file for complete search history.

(56) References Cited

FOREIGN PATENT DOCUMENTS

| | | |
|---|---|---|
| CN | 204442141 | 7/2015 |
| DE | 102014100525 | 7/2014 |
| JP | S39021405 | 9/1964 |
| JP | H1144342 | 2/1999 |
| JP | 2004057958 | 2/2004 |
| JP | 2006-007161 | 1/2006 |
| JP | 2011173074 | 9/2011 |
| JP | 2014107996 | 6/2014 |
| JP | 2014140785 | 8/2014 |
| JP | 2016101075 | 5/2016 |

OTHER PUBLICATIONS

"Office Action of China Counterpart Application", dated Apr. 20, 2020, with English translation thereof, p. 1-p. 14.
"Office Action of German Counterpart Application", dated Mar. 20, 2020, with English translation thereof, pp. 1-6.

\* cited by examiner

LINEAR ACTUATOR

CROSS-REFERENCE TO RELATED APPLICATION

This application is a 371 application of the international PCT application serial no. PCT/JP2017/028220, filed on Aug. 3, 2017, which claims the priority benefits of Japan application no. 2016-156894, filed on Aug. 9, 2016. The entirety of each of the abovementioned patent applications is hereby incorporated by reference herein and made a part of this specification.

TECHNICAL FIELD

The present invention relates to a linear actuator configured to linearly drive and vibrate a movable element.

BACKGROUND ART

A linear actuator including a movable element having a permanent magnet and a stationary element having a coil facing the permanent magnet has been proposed as a device configured to notify information by vibration. The stationary element includes a case configured to house the movable element (see Patent Document 1). Further, in the linear actuator described in Patent Document 1, in order to suppress resonance of the movable element, an air damper is configured between the case and the movable element.

CITATION LIST

Patent Literature

Patent Document 1: Japanese Unexamined Patent Application Publication No. 2006-007161

SUMMARY

Technical Problems

However, in the configuration described in Patent Document 1, the air damper is configured using the case, and thus, there is a problem in that vibration characteristics including a damper performance cannot be inspected, unless the linear actuator is assembled. Further, even if the resonance of the movable element is suppressed by arranging a damper member such as silicone gel between the movable element and the case instead of the air damper, there is the problem that the vibration characteristics including the damper performance cannot be inspected, unless the linear actuator is assembled.

In consideration of the problem mentioned above, an object of the present invention is to provide a linear actuator in which, when linearly driving and vibrating a movable element with respect to a stationary element by a magnetic drive mechanism, a damper member can be arranged between the stationary element and the movable element without using a case.

Solutions to Problems

In order to solve the problem mentioned above, a linear actuator according to the present invention includes a stationary element, a movable element, a magnetic drive mechanism configured to linearly move the movable element in the first direction with respect to the stationary element, and a damper member arranged between the movable element and the stationary element. The magnetic drive mechanism includes: a coil holder arranged on one side of the movable element and the stationary element, a coil supported by a coil supporting unit of the coil holder, a first yoke arranged on the other side of the movable element and the stationary element, and a first permanent magnet held by the first yoke and facing the coil in a second direction crossing the first direction. The damper member is arranged between the first yoke and the coil holder.

In the present invention, if the movable element is linearly moved and vibrated by the magnetic drive mechanism, the vibration is transmitted to a user. Therefore, information can be transmitted by vibration by switching the form of the vibration corresponding to the information to be transmitted. In this case, the damper member is arranged between the stationary element and the movable element, and thus, resonance of the movable element can be suppressed. Here, the damper member is arranged between the coil holder configured to hold the coil and the yoke configured to hold the permanent magnet, and no case is used for arranging the damper member. Thus, the damper members can be arranged between the stationary element and the movable element without using a case. Therefore, it is possible to arrange the damper members in a linear actuator having no case. Further, the damper members can be arranged during assembling in which no case is arranged.

In the present invention, it is possible to adopt an aspect where the damper member is arranged in a portion where the coil holder and the first yoke face each other in the second direction. According to this aspect, the damper members can be arranged between the coil holder and the first yoke without making a structure of the coil holder and the first yoke complicated.

In the present invention, it is possible to adopt an aspect where the coil holder includes a holder main body configured to support the coil from the opposite side of the first yoke by the coil supporting unit, and a coil plate configured to cover the coil from the side of the first yoke, and the damper member is arranged between the coil plate and the first yoke. According to this aspect, the damper members can be arranged at a position overlapping with the coil.

In the present invention, it is possible to adopt an aspect where the magnetic drive mechanism includes a second yoke arranged on the other side of the movable element and the stationary element at the opposite side of the first yoke with respect to the coil holder, and a second permanent magnet held by the second yoke and facing the coil at the opposite side of the first permanent magnet with respect to the coil in the second direction, and the damper member is further arranged in a portion where the coil holder and the second yoke face each other in the second direction.

In the present invention, it is possible to adopt an aspect where the coil includes two long sides that are arranged in parallel in the first direction and extend in a third direction crossing the first direction and the second direction, and two short sides connecting both ends of the long sides in the third direction, and the damper member is arranged on the side of the short sides of the coil.

In the present invention, it is possible to adopt an aspect where the damper member is a gel-like damper member.

In the present invention, it is possible to adopt an aspect where the coil holder and the coil are arranged on the side of the stationary element, and the first yoke and the first permanent magnet are arranged on the side of the movable element.

In the present invention, it is possible to adopt an aspect where the stationary element includes a case configured to house the movable element, the damper members, and the magnetic drive mechanism therein.

Effects of Invention

In the present invention, if the movable element is linearly moved and vibrated by the magnetic drive mechanism, the vibration is transmitted to a user. Therefore, information can be transmitted by vibration by switching the form of the vibration corresponding to the information to be transmitted. In this case, the damper member is arranged between the stationary element and the movable element, and thus, resonance of the movable element can be suppressed. Here, the damper member is arranged between the coil holder configured to hold the coil and the yoke configured to hold the permanent magnet, and no case is used for arranging the damper member. Thus, the damper members can be arranged between the stationary element and the movable element without using a case. Therefore, it is possible to arrange the damper members in a linear actuator having no case. Further, the damper members can be arranged during assembling in which no case is arranged.

DESCRIPTION OF EMBODIMENTS

Below, an embodiment of the present invention will be described with reference to the drawings. In the following description, description proceeds where X is allotted to a direction of a linear motion (first direction, vibration direction) of a movable element 6, Y is allotted to a second direction crossing the first direction X, and Z is allotted to a third direction crossing the first direction X and the second direction Y. It is noted that description proceeds where X1 is allotted to one side in the first direction X, X2 is allotted to the other side in the first direction X, Y1 is allotted to one side in the second direction Y, Y2 is allotted to the other side in the second direction Y, Z1 is allotted to one side in the third direction Z, and Z2 is allotted to the other side in the third direction Z.

(Overall Configuration)

Figure 1:
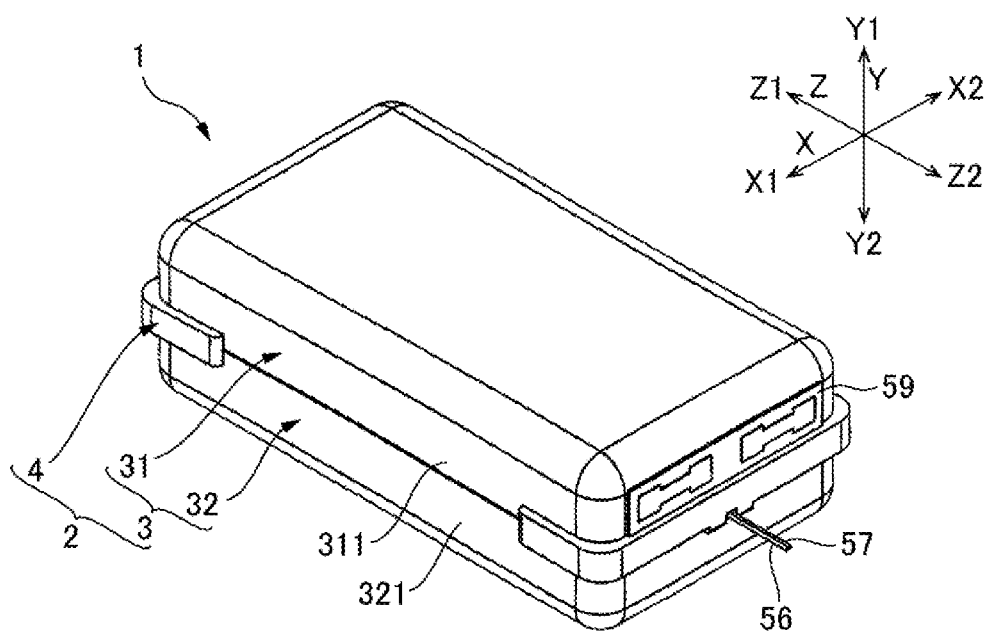
FIG. 1 is a perspective view of a linear actuator to which the present invention is applied.
Figure 2:
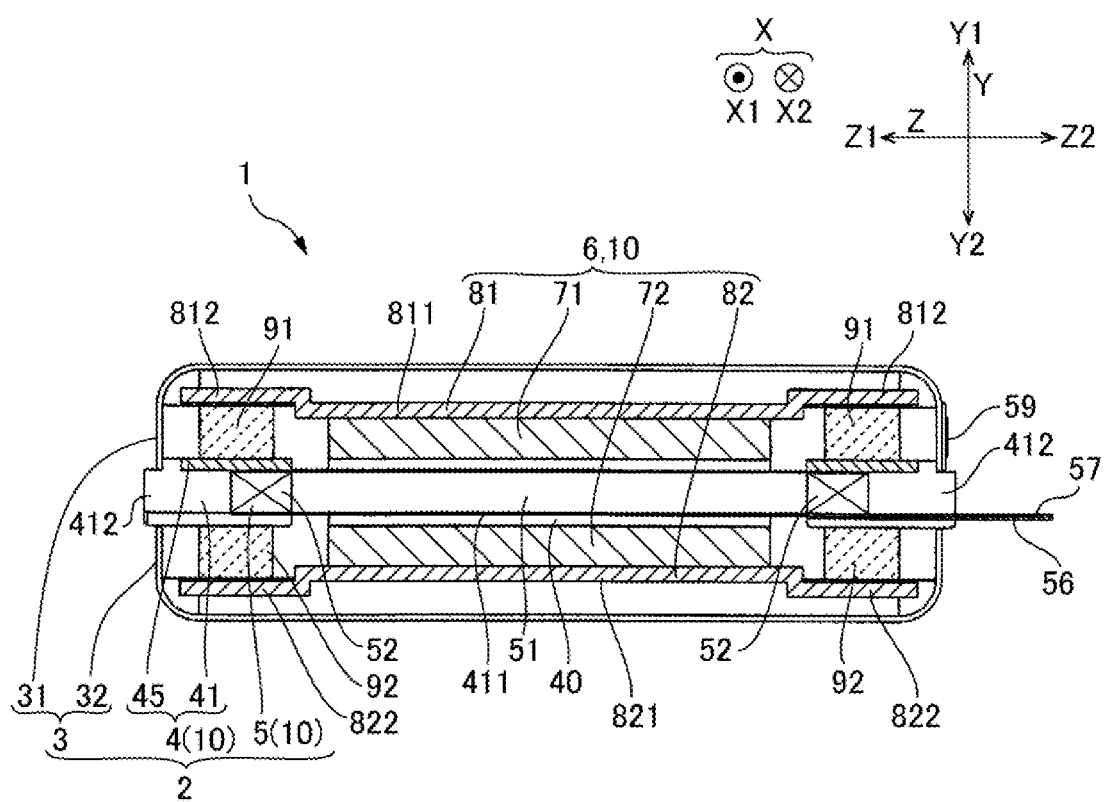
FIG. 2 is a Y-Z sectional view of the linear actuator illustrated in FIG. 1.
Figure 3:
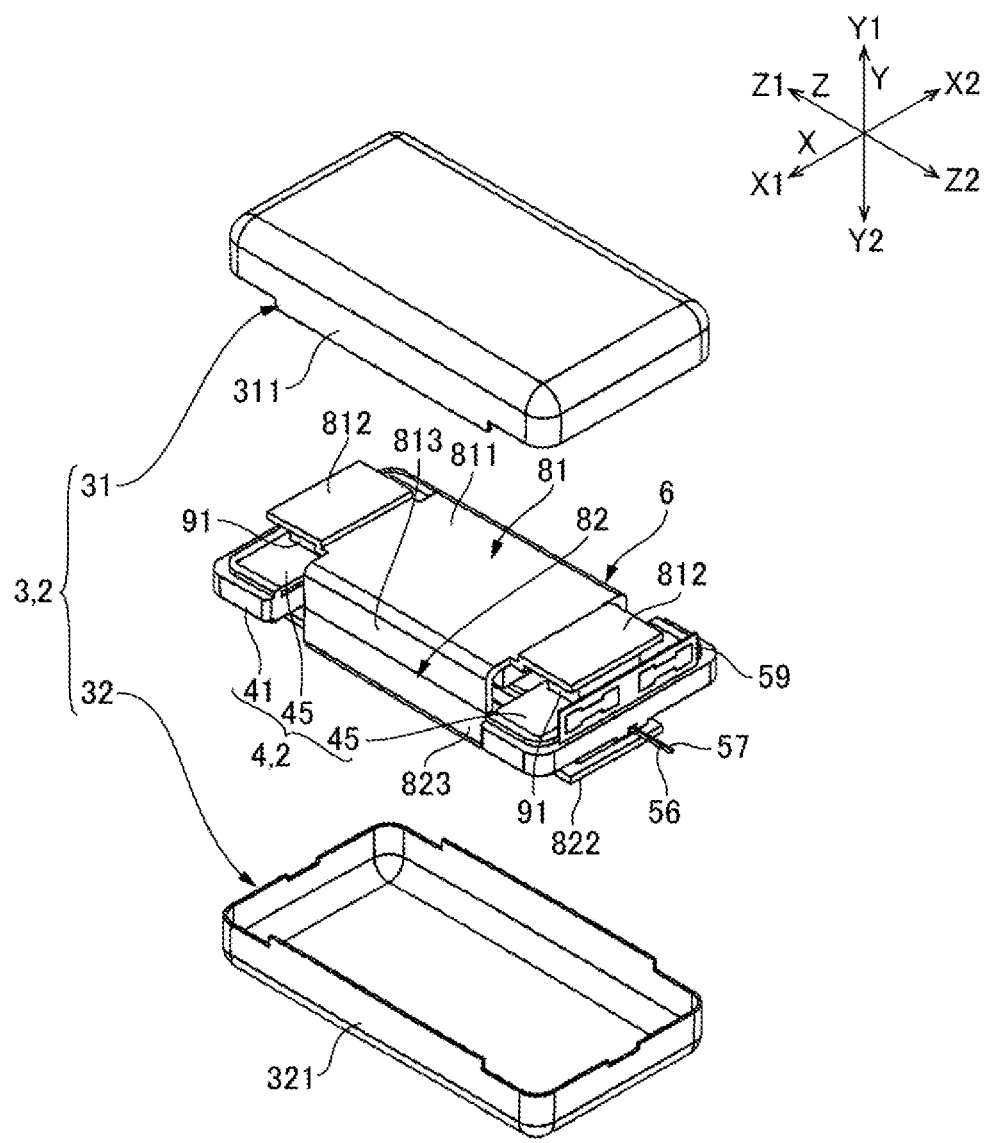
FIG. 3 is an exploded perspective view of the linear actuator illustrated in FIG. 1.
Figure 4:
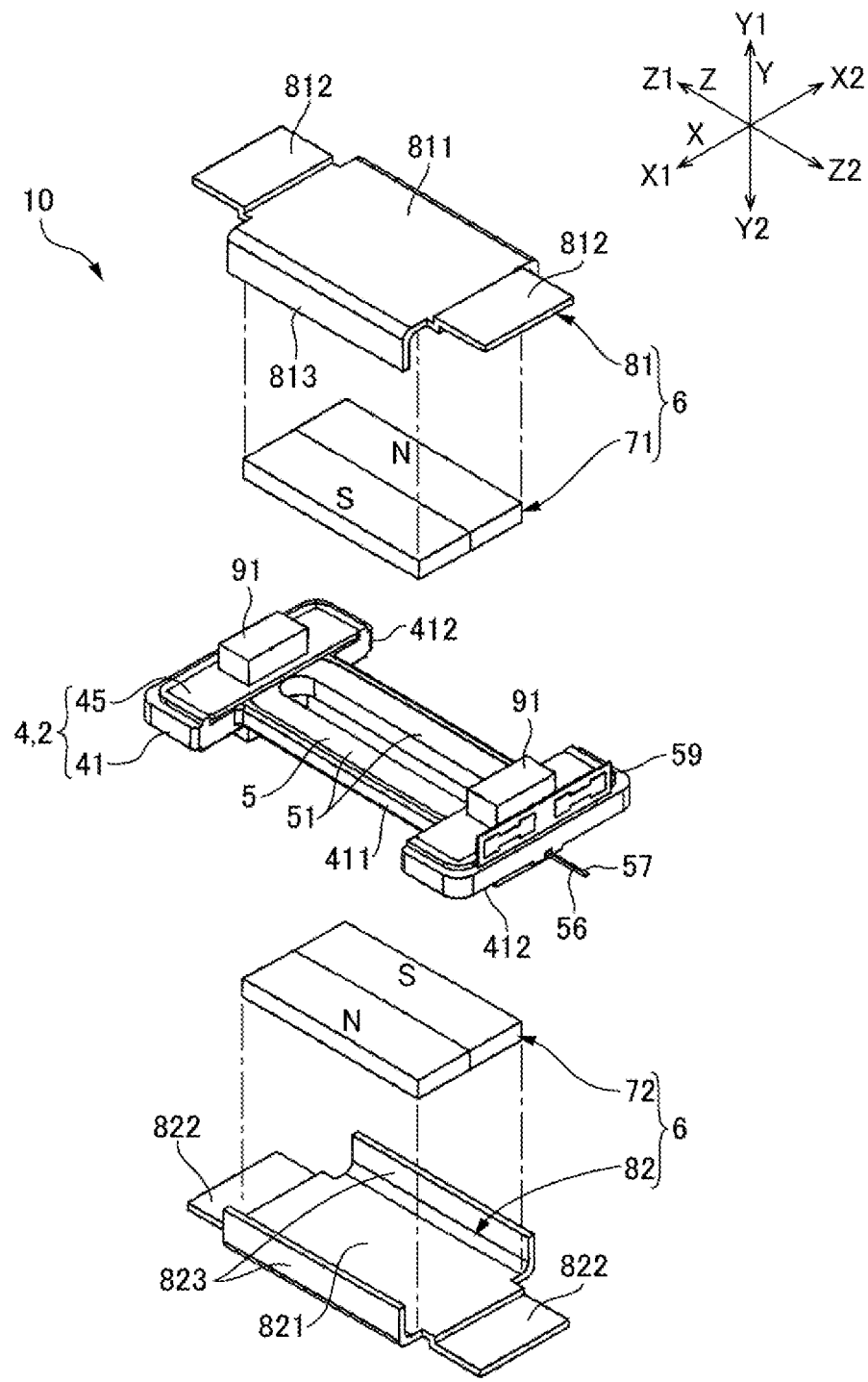
FIG. 4 is an exploded perspective view of a magnetic drive mechanism and the like used in the linear actuator illustrated in FIG. 1.
Figure 5:
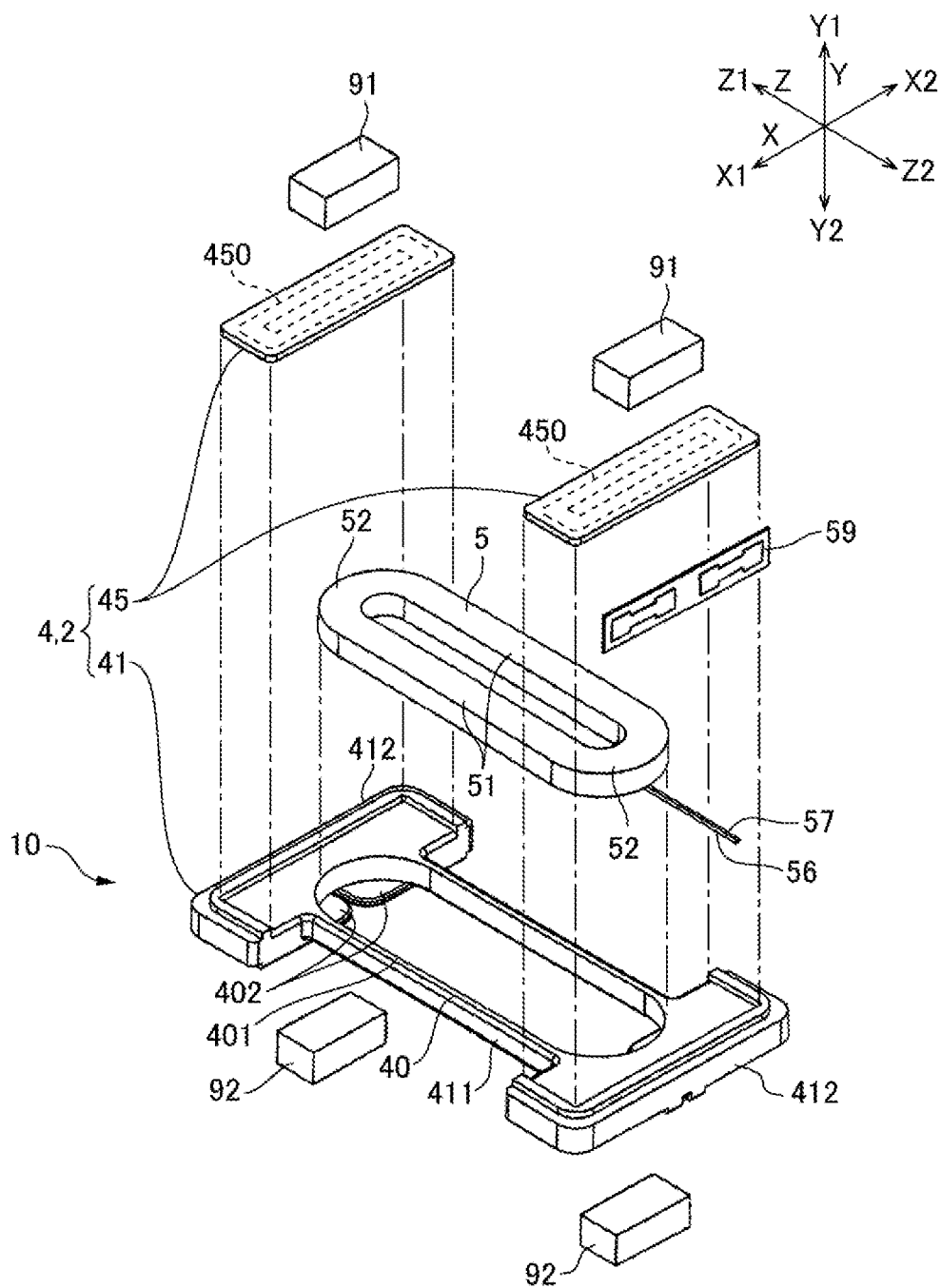
FIG. 5 is an explanatory view of a coil holder and the like used in the linear actuator illustrated in FIG. 1.

FIG. 1 is a perspective view of a linear actuator 1 to which the present invention is applied. FIG. 2 is a Y-Z sectional view of the linear actuator 1 illustrated in FIG. 1. FIG. 3 is an exploded perspective view of the linear actuator 1 illustrated in FIG. 1. FIG. 4 is an exploded perspective view of a magnetic drive mechanism and the like used in the linear actuator 1 illustrated in FIG. 1. FIG. 5 is an explanatory view of a coil holder and the like used in the linear actuator 1 illustrated in FIG. 1.

The linear actuator 1 illustrated in FIG. 1 has a rectangular parallelepiped shape with a longitudinal direction oriented in the third direction Z, and notifies a user who holds the linear actuator 1 in hand of information by way of vibration in the first direction X. Therefore, the linear actuator 1 can be utilized as an operation member or the like of a game machine, and a user can experience a new feeling by vibration or the like.

As illustrated in FIG. 2 and FIG. 3, the linear actuator 1 includes a stationary element 2 including a rectangular case 3 or the like that defines an outer shape of the linear actuator 1, and the movable element 6 supported inside the case 3 movably in the first direction X with respect to the stationary element 2, and the movable element 6 outputs information by vibrating in the first direction X.

In this embodiment, as described below with reference to FIGS. 2 to 5, the stationary element 2 includes the case 3, a coil holder 4, a coil 5, and a wiring board 59, and the movable element 6 includes permanent magnets (a first permanent magnet 71 and a second permanent magnet 72) and yokes (a first yoke 81 and a second yoke 82). Further, the magnetic drive mechanism 10 is constituted by the coil holder 4, the coil 5, the permanent magnets (the first permanent magnet 71 and the second permanent magnet 72), and the yokes (the first yoke 81 and the second yoke 82). Further, the movable element 6 is supported by the stationary element 2 via the damper members 91, 92 arranged between the movable element 6 and the stationary element 2.

(Configuration of Stationary Element 2)

As illustrated in FIG. 1, FIG. 2, and FIG. 3, the case 3 in the stationary element 2 includes a first case member 31 positioned on the one side Y1 in the second direction Y, and a second case member 32 overlapping with the first case member 31 on the other side Y2 in the second direction Y, and a side plate 311 of the first case member 31 and a side plate 321 of the second case member 32 are connected with each other to constitute the case 3. In that case, the coil holder 4, the coil 5, and the movable element 6 are housed between the first case member 31 and the second case member 32.

As illustrated in FIG. 2, FIG. 4, and FIG. 5, the magnetic drive mechanism 10 includes the coil 5 and the coil holder 4 configured to support the coil 5. The coil 5 is an air-core coil having an annular planar shape wound in an elliptical shape, and includes two long sides 51 arranged in parallel in the first direction X and extending in the third direction Z, and two arc-shaped short sides 52 connecting both ends of the two long sides 51 in the third direction Z.

As illustrated in FIG. 2, FIG. 4, and FIG. 5, the coil holder 4 includes a holder main body 41 configured to support the coil 5 from the other side Y2 (the opposite side of the first yoke 81) in the second direction Y by a coil supporting unit 40 and two coil plates 45 configured to cover the coil 5 from the one side Y1 (the side of the first yoke 81) in the second direction Y at two positions separated in the third direction Z. The holder main body 41 includes a first plate 411 extending in the third direction Z and second plates 412 protruding to both sides in the first direction X at both sides of the first plate 411 in the third direction Z. If the first case member 31 and the second case member 32 are placed on each other, as illustrated in FIG. 1, each of outer peripheries of the two second plates 412 is sandwiched between the side plates 311, 321.

As illustrated in FIG. 2, FIG. 4, and FIG. 5, the coil supporting unit 40 is arranged on the first plate 411 of the coil holder 4. The coil supporting unit 40 includes a coil housing hole 401 formed of an elliptical through hole housing the coil 5 and supporting plates 402 protruding toward the coil housing hole 401 at both ends of the coil housing hole 401 in the third direction Z on the other side Y2 in the second direction Y. Therefore, if the coil 5 is housed in the coil housing hole 401, the supporting plates 402 support the coil 5 from the other side Y2 in the second direction Y.

In this state, the short sides 52 on both sides of the coil 5 in the third direction Z are covered by the coil plates 45 from the one side Y1 in the second direction Y. In this case, the coil 5 is fixed to the holder main body 41 by the coil plates 45 by applying an adhesive to the surfaces of the supporting plates 402 and the coil plates 45 on the side of the coil 5. In the present embodiment, annular concaves 450 are formed on the surfaces of the coil plates 45 on the side of the coil 5, as reservoirs for the adhesive (see FIG. 5).

The wiring board 59 for power supply to the coil 5 is fixed to an end of the coil holder 4 on the other side Z2 in the third direction Z and ends 56, 57 of a winding used for the coil 5 are connected to the wiring board 59.

(Configuration of Movable Element 6)

As illustrated in FIG. 2, FIG. 3, and FIG. 4, the magnetic drive mechanism 10 includes the first yoke 81 including a magnetic plate arranged on the one side Y1 in the second direction Y with respect to the coil 5, and the first flat permanent magnet 71 held on a surface of the first yoke 81 on the other side Y2 in the second direction Y so to face the coil 5 on the one side Y1 in the second direction Y. Further, the magnetic drive mechanism 10 includes the second yoke 82 including a magnetic plate arranged on the other side Y2 in the second direction Y with respect to the coil 5, and the second flat permanent magnet 72 held on a surface of the second yoke 82 on the one side Y1 in the second direction Y so to face the coil 5 on the other side Y2 in the second direction Y. In the present embodiment, the movable element 6 includes the first yoke 81, the first permanent magnet 71, the second yoke 82, and the second permanent magnet 72.

The first yoke 81 includes a first flat plate 811 overlapping with the first permanent magnet 71, two second flat plates 812 protruding from the both ends of the first flat plate 811 in the third direction Z to the one side Z1 and the other side Z2 in the third direction Z, and two third flat plates 813 bent from the both ends of the first flat plate 811 in the first direction X to the other side Y2 in the second direction Y. The two third flat plates 813 cover the first permanent magnet 71 from both sides in the first direction X. The two second flat plates 812 face the coil plates 45 of the coil holder 4 on the one side Y1 in the second direction Y.

The second yoke 82 has a structure similar to that of the first yoke 81. That is, the second yoke 82 includes a first flat plate 821 overlapping with the second permanent magnet 72, two second flat plates 822 protruding from the both ends of the first flat plate 821 in the third direction Z to the one side Z1 and the other side Z2 in the third direction Z, and two third flat plates 823 bent from the both ends of the first flat plate 821 in the first direction X to the one side Y1 in the second direction Y. The two third flat plates 823 cover the second permanent magnet 72 from both sides in the first direction X. The two second flat plates 822 face the coil plates 45 of the coil holder 4 on the other side Y2 in the second direction Y.

The first permanent magnet 71 and the second permanent magnet 72 face the two long sides 51 of the coil 5 respectively at the one side Y1 and the other side Y2 in the second direction Y. In the first permanent magnet 71, for example, the one side X1 in the first direction X is magnetized as an N-pole and the other side X2 in the first direction X is magnetized as an S-pole. In the second permanent magnet 72, as opposed to the first permanent magnet 71, the one side X1 in the first direction X is magnetized as an S-pole and the other side X2 in the first direction X is magnetized as an N-pole.

(Configuration of Gel-Like Damper Members 91, 92)

As illustrated in FIG. 2, FIG. 3, FIG. 4, and FIG. 5, the movable element 6 is supported to be linearly moveable back and forth in the first direction X by the damper members 91, 92 arranged between the movable element 6 and the stationary element 2. Thus, in the present embodiment, no leaf spring or the like for supporting the movable element 6 to be linearly moveable back and forth in the first direction X is arranged between the movable element 6 and the stationary element 2.

In the present embodiment, the damper members 91 are arranged between the first yoke 81 and the coil holder 4 in a portion where the coil holder 4 and the first yoke 81 face each other in the second direction Y. The damper members 92 are arranged between the second yoke 82 and the coil holder 4 in a portion where the coil holder 4 and the second yoke 82 face each other in the second direction Y. More specifically, the damper members 91 are arranged at two positions sandwiched between the two coil plates 45 of the coil holder 4 and the two second flat plates 812 of the first yoke 81, and the damper members 92 are arranged at two positions sandwiched between the two second plates 412 of the coil holder 4 and the two second flat plates 822 of the second yoke 82. Therefore, the damper members 91, 92 are arranged on the side of the short sides 52 of the coil 5.

In the present embodiment, the damper members 91, 92 are viscoelastic bodies. Here, viscoelasticity is a property obtained by combining both viscosity and elasticity, and is a property remarkably observed in a polymer material such as a gel-like member, a plastic, and a rubber. Therefore, various types of gel-like members can be employed as the damper members 91, 92 (viscoelastic bodies). Further, examples of the damper members 91, 92 (viscoelastic bodies) to be employed may include various types of rubber materials and a modified material thereof including natural rubber, diene-based rubber (such as styrene-butadiene rubber, isoprene rubber, and butadiene rubber), chloroprene rubber, and acrylonitrile-butadiene rubber), non-diene rubber (such as butyl rubber, ethylene-propylene rubber, ethylene-propylene-diene rubber, urethane rubber, silicone rubber, and fluororubber), and a thermoplastic elastomer. More specifically, the damper members 91, 92 (viscoelastic bodies) are gel-like damper members made of a silicone gel or the like. In the present embodiment, the damper members 91, 92 are formed by a silicone-based gel having a penetration of 10 to 110 degrees. The penetration is stipulated in JIS-K-2207 or JIS-K-2220, and the smaller this value, the harder the material. The damper members 91, 92 have a linear or nonlinear stretch characteristic depending on a direction of their extension or contraction. For example, if the damper members 91, 92 are compressed and deformed by being pressed in their thickness direction (axial direction), the damper members 91, 92 have a stretch characteristic where a nonlinear component (spring coefficient) is larger than a linear component (spring coefficient). On the other hand, if extended by being pulled in the thickness direction (axial direction), the damper members 91, 92 have a stretch characteristic where the linear component (spring coefficient) is larger than the nonlinear component (spring coefficient). As a result, if the damper members 91, 92 are compressed and deformed by being pressed in the thickness direction (axial direction) between a movable element 6 and a stationary element 2, it is possible to prevent the damper members 91, 92 from being greatly deformed, and thus, it is possible to suppress a large change in a gap between the movable element 6 and the stationary element 2. On the other hand, if being deformed in a direction (shear direction) crossing the thickness direction (axial direction), the damper members 91, 92 are deformed in a direction where the damper members 91, 92 are pulled and extended in whichever direction the motion is made, and in this case, the damper members 91, 92 have a deformation characteristic where the linear component (spring coefficient) is larger than the nonlinear component (spring coefficient). Therefore, in the damper members 91, 92, the spring force depending on the direction of motion is constant. Thus, by using a spring element in the shear direction of the damper members 91, 92, it is possible to improve a reproducibility of a vibration acceleration for an input signal, so that it is possible to achieve vibration with subtle nuances. It is noted that the fixation of the damper members 91, 92 to the first yoke 81 and the second yoke 82 and the fixation of the damper members 91, 92 to the coil holder 4 are achieved by utilizing an adhesive, a pressure sensitive adhesive, or an adhesiveness of a silicone gel.

(Operation)

If power is supplied from the outside (higher device) to the coil 5 via the wiring board 59 in the linear actuator 1 according to the present embodiment, the movable element 6 is moved back and forth in the first direction X by the magnetic drive mechanism 10 including the coil 5, the first permanent magnet 71, and the second permanent magnet 72. Therefore, the user who holds the linear actuator 1 in hand can obtain information by way of vibration from the linear actuator 1. In this case, the frequency of a signal waveform to be applied to the coil 5 is changed depending on information to be transmitted. Further, the polarity of the signal waveform to be applied to the coil 5 is reversed, and in this case, the voltage is changed either gradually or steeply depending on a period during which the polarity of a drive signal is negative and a period during which the polarity of the drive signal is positive. As a result, a difference occurs between an acceleration achieved when the movable element 6 moves to the one side X1 in the first direction X and an acceleration achieved when the movable element 6 moves to the other side X2 in the first direction X. Therefore, the user can feel an illusion that the linear actuator 1 moves toward the one side X1 or the other side X2 in the first direction X.

Further, in the present embodiment, it is possible to adopt a configuration where the support body includes a holder configured to hold the coil 5 or the first permanent magnet 71, the second permanent magnet 72, and the damper members 91, 92 are arranged at positions where the holder and the movable element 6 face each other in the first direction X. This eliminates necessity for securing a gap for arranging the damper members 91, 92 between the movable element 6 and a cover. Therefore, a thickness of the actuator can be reduced. Further, the damper members 91, 92 can be attached in a state before attaching the cover, and thus, the vibration characteristics including the damper performance can be inspected in the state before attaching the cover.

(Main Effect of Present Embodiment)

As described above, in the linear actuator 1 according to the present embodiment, the damper members 91, 92 are arranged between the movable element 6 and the stationary element 2, and thus, the resonance of the movable element 6 can be suppressed. Here, the damper members 91 are arranged between the coil holder 4 and the first yoke 81, and the damper members 92 are arranged between the coil holder 4 and the second yoke 82. Therefore, the case 3 is not used for arranging the damper members 91, 92. Thus, the damper members 91, 92 can be arranged between the stationary element 2 and the movable element 6 without using the case 3. Therefore, the damper members 91, 92 can be arranged during assembling in which the case 3 is not arranged, and thus, the vibration characteristics including the damper characteristics can be measured during manufacturing. Further, the case 3 is not used for arranging the damper members 91, 92, and thus, the damper members 91, 92 can be arranged in a linear actuator not including the case 3.

Further, the damper members 91, 92 for suppressing the resonance of the movable element 6 are arranged at a total of four positions separated in the first direction X and the third direction Z, and thus, the movable element 6 can be supported movably in the first direction X without using a plate-shaped spring or the like.

Further, the damper members 91, 92 are arranged at positions where the stationary element 2 and the movable element 6 face each other in the second direction Y crossing the first direction X (vibration direction), and thus, if the movable element 6 vibrates in the first direction X, the damper members 91, 92 deform in the shearing direction of the movable element 6 and prevent resonance. Therefore, even if the movable element 6 vibrates in the first direction X, a change in the elastic modulus of the damper members 91, 92 is small, and thus, the resonance of the movable element 6 can be effectively suppressed.

Further, the damper members 91 are arranged in a portion where the coil holder 4 and the first yoke 81 face each other in the second direction Y and the damper members 92 are arranged in a portion where the coil holder 4 and the second yoke 82 face each other in the second direction Y. Therefore, in contrast to a state where the damper members 91 face the coil holder 4 and the first yoke 81 in the first direction X or the third direction Z, the damper members 91, 92 can be arranged between the coil holder 4 and the first yoke 81 and between the coil holder 4 and the second yoke 82, without making a structure of the coil holder 4, the first yoke 81, and the second yoke 82 complicated.

Further, the coil holder 4 includes the holder main body 41 configured to support the coil 5 from the opposite side of the first yoke 81 by the coil supporting unit 40, and the coil plates 45 configured to cover the coil 5 from the side of the first yoke 81, and thus, the damper members 91 can be arranged at a position overlapping with the coil 5.

Other Embodiments

In the embodiment described above, the second permanent magnet 72 and the second yoke 82 are arranged on the other side Y2 of the coil 5 in the second direction Y, however, the present invention may apply to a linear actuator in which only the second yoke 82 is arranged on the other side Y2 of the coil 5 in the second direction Y and the second permanent magnet 72 is not provided.

In the embodiment described above, the coil holder 4 and the coil 5 are arranged on the stationary element 2, and the permanent magnets (the first permanent magnet 71 and the second permanent magnet 72) and the yokes (the first yoke 81 and the second yoke 82) are arranged on the movable element 6, however, the present invention may apply to a linear actuator in which the coil holder 4 and the coil 5 are arranged on the movable element 6 and the permanent magnets (the first permanent magnet 71 and the second permanent magnet 72) and the yokes (the first yoke 81 and the second yoke 82) are arranged on the stationary element 2.

In the embodiment described above, the damper members 91, 92 are arranged in a portion where the stationary element 2 and the movable element 6 face each other in the second direction Y, however, the present invention may apply to a linear actuator in which the damper members 91 and 92 are arranged in a portion where the stationary element 2 and the movable element 6 face each other in the first direction X or the third direction Z.

The invention claimed is:

1. A linear actuator, comprising:
 a movable element;
  a stationary element;
  a magnetic drive mechanism, configured to linearly move the movable element in a first direction with respect to the stationary element; and
  a damper member, arranged between the movable element and the stationary element;
  wherein,
  the magnetic drive mechanism comprises:
   a coil holder, arranged on one side of the movable element and the stationary element;
   a coil, supported by a coil supporting unit of the coil holder;
   a first yoke, arranged on the other side of the movable element and the stationary element; and
   a first permanent magnet, held by the first yoke and facing the coil in a second direction crossing the first direction, and
  the damper member is interposed between the first yoke and the coil holder,
  wherein the damper member is fixed to portions where the coil holder and the first yoke face each other in the second direction.

2. The linear actuator according to claim 1, wherein the coil holder comprises:
 a holder main body, configured to support the coil from an opposite side of the first yoke by the coil supporting unit; and
 a coil plate, configured to cover the coil from a side of the first yoke, and
 the damper member is arranged between the coil plate and the first yoke.

3. The linear actuator according to claim 1, wherein the magnetic drive mechanism comprises:
 a second yoke, arranged on the other side of the movable element and the stationary element at an opposite side of the first yoke with respect to the coil holder; and
 a second permanent magnet, held by the second yoke and facing the coil at an opposite side of the first permanent magnet with respect to the coil in the second direction, and
 the damper member is further arranged in a portion where the coil holder and the second yoke face each other in the second direction.

4. The linear actuator according to claim 1, wherein the coil comprises:
 two long sides, arranged in parallel in the first direction and extending in a third direction crossing the first direction and the second direction; and
 two short sides, connecting both ends of the long sides in the third direction, and
 the damper member is arranged on a side of the short sides of the coil.

5. The linear actuator according to claim 1, wherein the damper member is a gel-like damper member.

6. The linear actuator according to claim 1, wherein the coil holder and the coil are arranged on a side of the stationary element, and
 the first yoke and the first permanent magnet are arranged on a side of the movable element.

7. The linear actuator according to claim 1, wherein the stationary element comprises: a case, configured to house the movable element, the damper member, and the magnetic drive mechanism therein.

8. The linear actuator according to claim 2, wherein the magnetic drive mechanism comprises:
 a second yoke, arranged on the other side of the movable element and the stationary element at an opposite side of the first yoke with respect to the coil holder; and
 a second permanent magnet, held by the second yoke and facing the coil at an opposite side of the first permanent magnet with respect to the coil in the second direction, and
 the damper member is further arranged in a portion where the coil holder and the second yoke face each other in the second direction.

* * * * *